Figure 1:
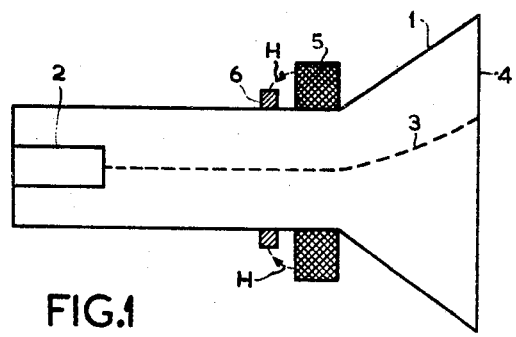

Oct. 30, 1962     C. LE COMTE     3,061,753
INDICATING SYSTEM COMPRISING A CATHODE RAY TUBE

Filed Nov. 27, 1959

INVENTOR
C. LE COMTE

BY
AGENT

United States Patent Office 3,061,753
Patented Oct. 30, 1962

3,061,753
INDICATING SYSTEM COMPRISING A CATHODE RAY TUBE
Corstiaan Le Comte, Hilversum, Netherlands, assignor to North American Philips Company Inc., New York, N.Y., a corporation of Delaware
Filed Nov. 27, 1959, Ser. No. 855,696
Claims priority, application Netherlands Dec. 6, 1958
2 Claims. (Cl. 313—84)

This invention relates to devices, in particular radar transceivers, comprising a cathode-ray tube with means to form an electron beam and at least one deflection coil system with a ferromagnetic circuit surrounding a part of the tube.

A drawback in such devices is that, in spite of careful choice of the material, the magnetic circuit of the deflection system still has a certain remanent magnetism. This is annoying in particular in the case of oscillographs for measuring purposes and in the case of radar picture tubes. In the latter case, the beam for projecting a succession of echo pictures follows various lines on the screen, while in the dead time between two lines, for example, definite marks are rapidly formed on the screen and that invariably different marks, so for example one time at the top of the screen and another time at the bottom of the screen. The result hereof is that at the onset of the various picture lines proper, not always the same magnetic remanence is present in the deflection system and corresponding spots of successive lines are shifted somewhat with respect to one another. It has appeared that even a remanence as low as $\frac{1}{1000}$ is noticeable.

It is to be noted that devices are known per se in which an annular member of ferromagnetic material is provided around the neck of the tube in the neighbourhood of the system of deflection coils.

In particular devices, for example, an annular permanent magnet is used for focussing a beam. The field of such a magnet is constant and is not influenced by the leakage field of the deflection coils. In other devices, a ferromagnetic plate is provided for mutual protection between the focussing device and the deflection system.

In other devices, a soft-iron ring is used which is provided within the magnetic leakage field of the deflection system and the distance of which from this system is adjustable. The object of this device is to be able to adjust the extent of the deflection by partly short-circuiting the magnetic circuit of the deflection system. These known devices do not remove the effect of the disturbing remanence of the magnetic deflection system.

The device according to the invention also comprises an annular member of ferromagnetic material around the tube in the neighbourhood of the system of deflection coils. According to the invention, the annular member is provided at such a distance from the system of coils that the effect of the remanent magnetic field of the ferromagnetic circuit of the deflection of the beam of electrons is removed. Preferably, the material of the annular member is chosen so that the coercive force which corresponds to the same primary exciter field, is at least ten times as large for the annular member as for the material of the magnetic circuit.

Figures 2, 5:
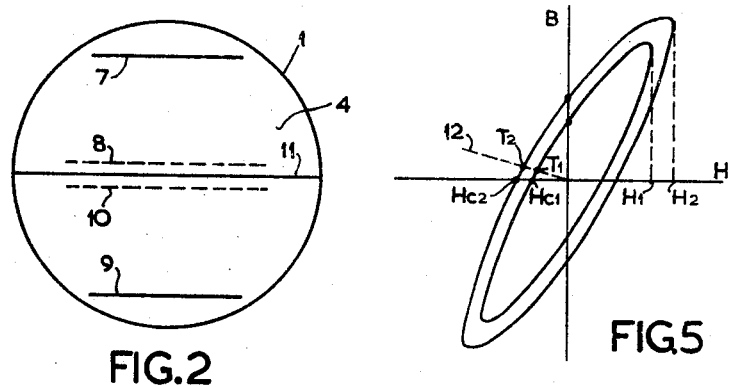
Figure 3:
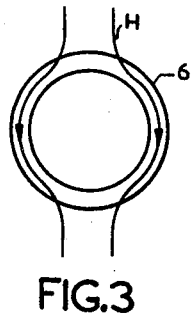
Figure 4:
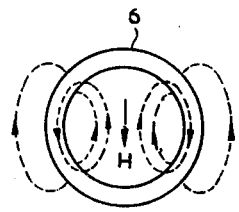

In order that the invention may be readily carried into effect, it will now be described in greater detail with reference to the accompanying drawing, in which FIG. 1 is a diagrammatic view of a cathode ray tube system according to the invention;

FIG. 2 is an illustration of the presentation on the screen of the tube of FIG. 1, and shows the effect of remanence of the deflection system;

FIGS. 3 and 4 illustrate the magnetic field associated with the annular member 6 of the system of FIG. 1; and FIG. 5 illustrates the hysteresis loops of the annular member 6.

Referring now to the drawing, FIG. 1 shows diagrammatically a cathode-ray tube 1 with means 2 for producing a beam of electrons 3, and a picture screen 4. Around the neck of the tube, a system of deflection coils 5 having a ferromagnetic circuit is provided for deflecting the beam 3 into two directions at right angles to each other. The deflection system may be constructed in known manner and may consist, for example, of a cylinder of ferromagnetic material, the inner wall of which is provided with axial slits for receiving the windings, while the parts of the cylinder between the slits form pole shoes, analogous to the stator of an electromotor. For the horizontal and the vertical deflection of the beam, two separate windings are provided. If, for example, an alternating current is supplied to the winding for the horizontal deflection, the beam on the screen of the tube will follow a horizontal line. If at the same time a direct current is supplied to the other winding so that the beam is deflected upwards, the beam on the screen 4 will follow a horizontal line 7 as shown in FIG. 2. If subsequently the direct current is cut off, the beam will follow a line 8 on the screen. In the case of opposite direct current through the winding for the vertical deflection, the beam will follow a line 9 and, after cutting off this current, a line 10. Although in both cases no vertical deflection current is present, the lines 8 and 10 do not coincide on the screen. This is a result of the remanent magnetism of the magnetic circuit, that is to say when removing the deflecting current through a winding, a certain remanent magnetic field remains, causing a deflection of the beam in the initial direction.

According to the invention, a ring 6 of ferromagnetic material with comparatively high remanence and a comparatively strong coercive force is provided around the neck of the tube 1 at a comparatively small distance from the deflection system 5. This ring is within the magnetic leakage field H of the deflection system 5 and will, for example, be magnetized by this field as shown in FIG. 3.

If, subsequently, the magnetizing current in the deflection system is cut off, a certain remanent field remains in the ring 6, causing a system of lines of force as shown in dashed lines in FIG. 4.

As appears from this figure, the direction of these lines of force is opposite to the direction of the remanent field of the deflection system 5, indicated by the arrow H in FIG. 4 and having the same direction as the original deflection field of the deflection system. The remanent field of the deflection system 5 will cause a deflection of the beam in a certain direction, while the remanent field of the ring 6 will cause a deflection in the opposite direction. It has appeared from experiments that the position of the lines 8 and 10 as shown in FIG. 2 can be varied by varying the distance from the ring 6 to the deflection system 5, and that, for example, at a sufficient small distance, the lines 8 and 10 can even be brought to the other side of the middle line 11. By adjusting said distance the lines 8 and 10 can consequently be made to coincide. So in that case, the effect of the remanent field of the deflection system 5 is removed by the remanent field of the ring 6.

FIG. 5 shows two hysteresis loops of the core 6, namely a small loop which is followed when driving to a field $H_1$ and a larger loop corresponding to the driving to a field $H_2$. Since the induction B remains small in comparison with the saturation value, the two loops are practically uniform. In practice, the loops should be thought to be far steeper than is shown in the drawing. When the magnetizing field $H_1$ or $H_2$ is removed, the ring 6 is practically entirely demagnetized because the reluctance of the external circuit, through which the lines of force have to close and which extends practically entirely in the air, is very high. A magnetic state $T_1$ or $T_2$ will ensue, on the line 12 in FIG. 5, the field being practically equal to the coercive forces $HC_1$ and $HC_2$ corresponding to the primary fields $H_1$ and $H_2$.

As already stated above, the ring 6 is at a comparatively short distance from the deflection system 5 and will consequently cause a certain short-circuit for the deflection system, as a result of which the deflecting field is attenuated. In order to keep this effect as slight as possible, it is desirable to be able to provide the ring 6 at the largest possible distance from the system 5. This means that the material of the ring 6 should be chosen so that already by a comparatively weak leakage field of the deflection system 5 a comparatively strong remanent field has to be produced by the ring 6. On the other hand, it should be endeavoured that the slightest possible remanence of the deflection system 5 itself remains. For the magnetic circuit of the deflection system 5, a material should consequently be chosen of relatively narrow hysteresis loop and consequently small coercive force, whereas the material of the ring 6 should have a relatively large coercive force, that is to say, from a magnetic point of view the material of the ring 6 should, as it were, be far from ideal. The material of the ring 6 is preferably chosen so that the coercive force which corresponds to a definite primary exciter field H is at least ten times as large as the coercive force of the material of the deflection system 5 corresponding to the same exciter field.

What is claimed is:

1. An indicating system comprising a cathode ray tube, deflection coil means comprising a ferromagnetic circuit surrounding a part of said tube, and an annular member of ferromagnetic material surrounding said tube adjacent said deflection coil means within the magnetic leakage field of said deflection coil means, said annular member being axially spaced from said deflection coil means at such a distance that the effect of the remanent field of said ferromagnetic circuit on the deflection of the electron beam of said tube is removed, the coercive force of the magnetic material of said annular member corresponding to a given primary exciting field being at least ten times as large as the coercive force for the magnetic material of said ferromagnetic circuit corresponding to the same exciting field.

2. An indicating system comprising a cathode ray tube having means for producing a beam of electrons and a screen in the path of said electron beam, deflection coil means positioned externally of said tube and having ferromagnetic circuit means at least partly surrounding said beam of electrons, an annular member of ferromagnetic material surrounding said electron beam externally of said tube and within the magnetic leakage field of said deflection coil means, the magnetic material of said annular member having a coercive force corresponding to a given primary exciting field that is at least ten times as large as the coercive force for the magnetic material of said ferromagnetic circuit corresponding to the same exciting field, and means for axially adjusting the axial spacing between said annular member and said deflection coil means.

References Cited in the file of this patent
UNITED STATES PATENTS

| | | |
|---|---|---|
| 2,494,459 | Torsch | Jan. 10, 1950 |
| 2,748,305 | Davies | May 29, 1956 |
| 2,793,311 | Thomas | May 21, 1957 |
| 2,861,209 | Biggs | Nov. 18, 1958 |